Jan. 10, 1961 H. H. NUSSBAUM 2,967,531
APPARATUS FOR WASHING RECEPTACLES
Filed Feb. 29, 1956 6 Sheets-Sheet 1
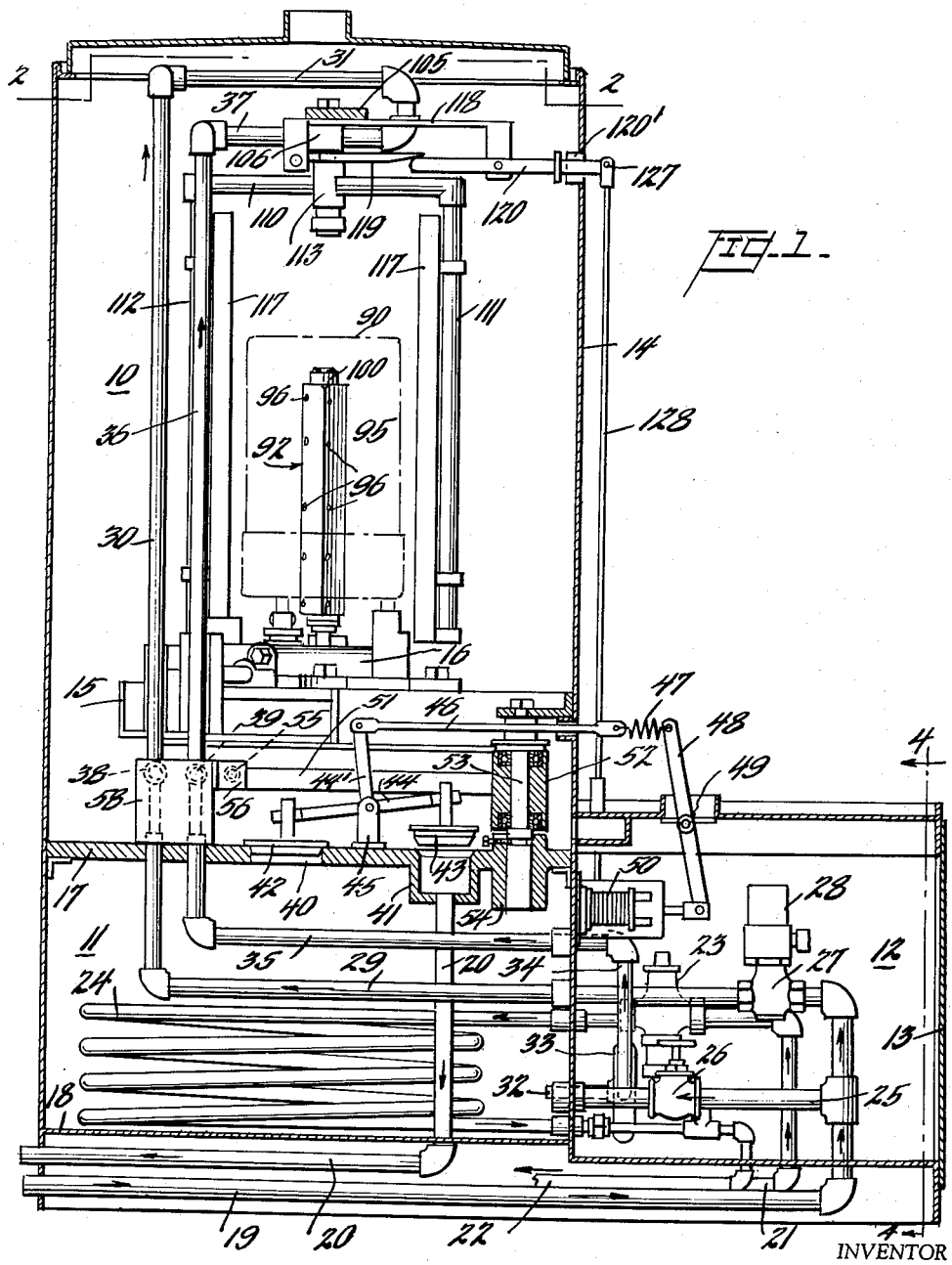
INVENTOR
Herbert H. Nussbaum
BY
Watson, Cole, Grindle & Watson
ATTORNEYS

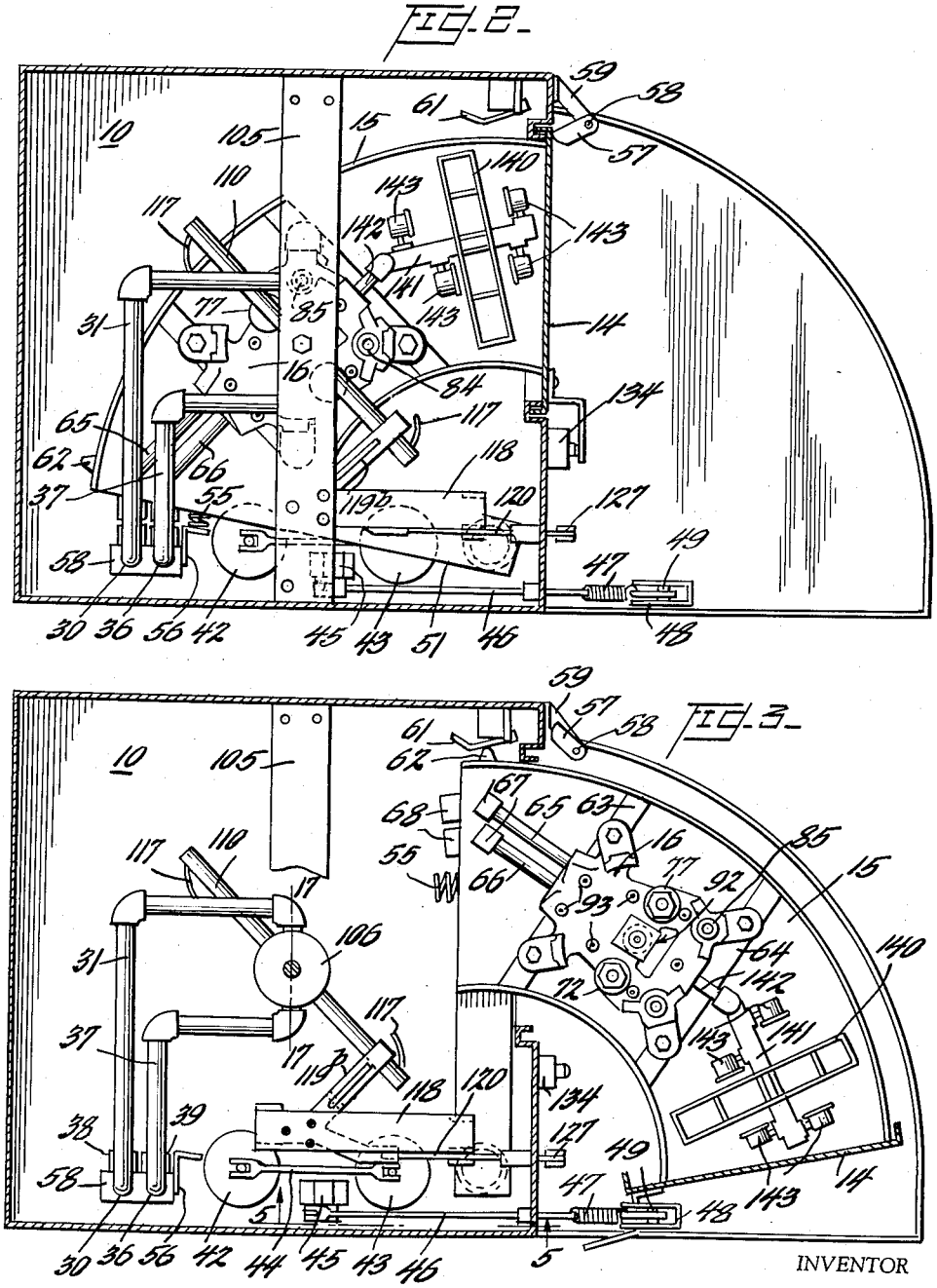

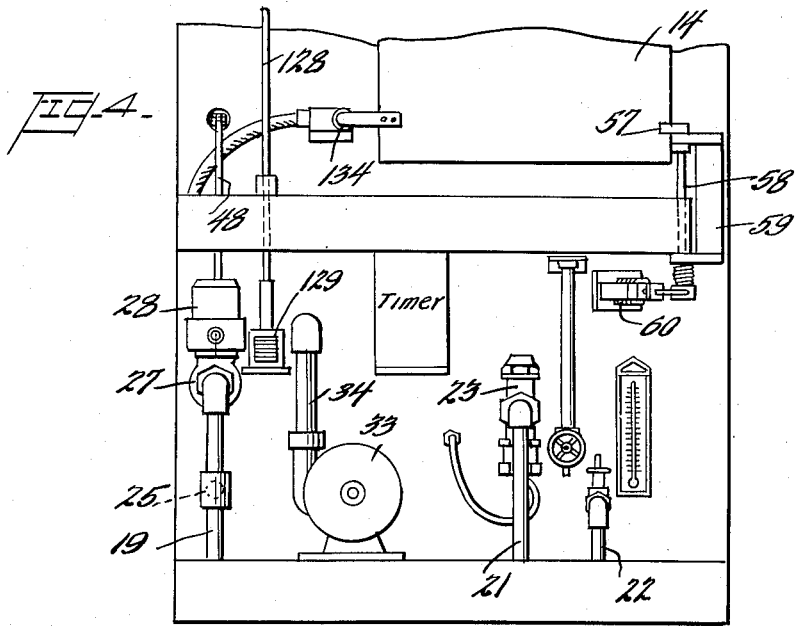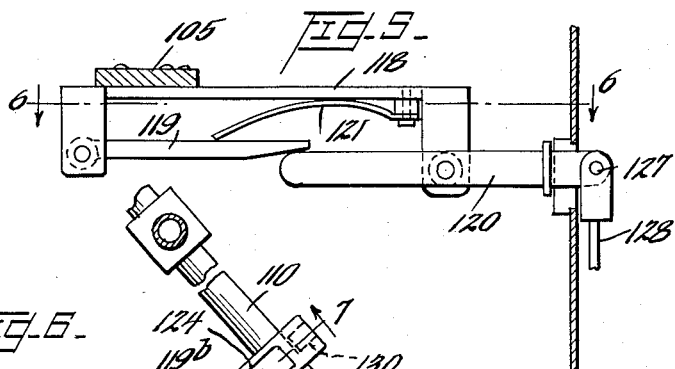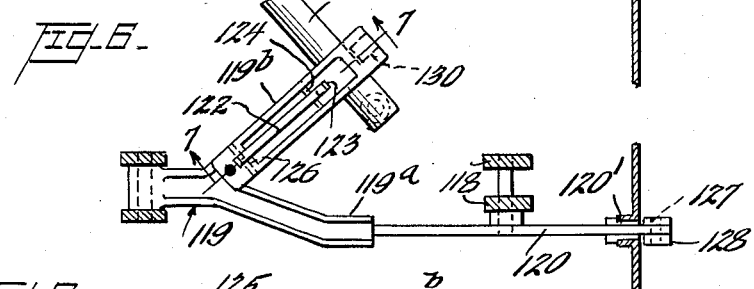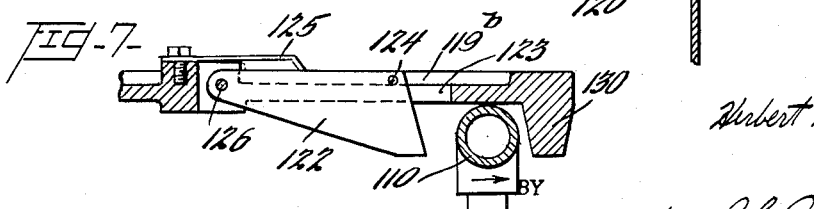

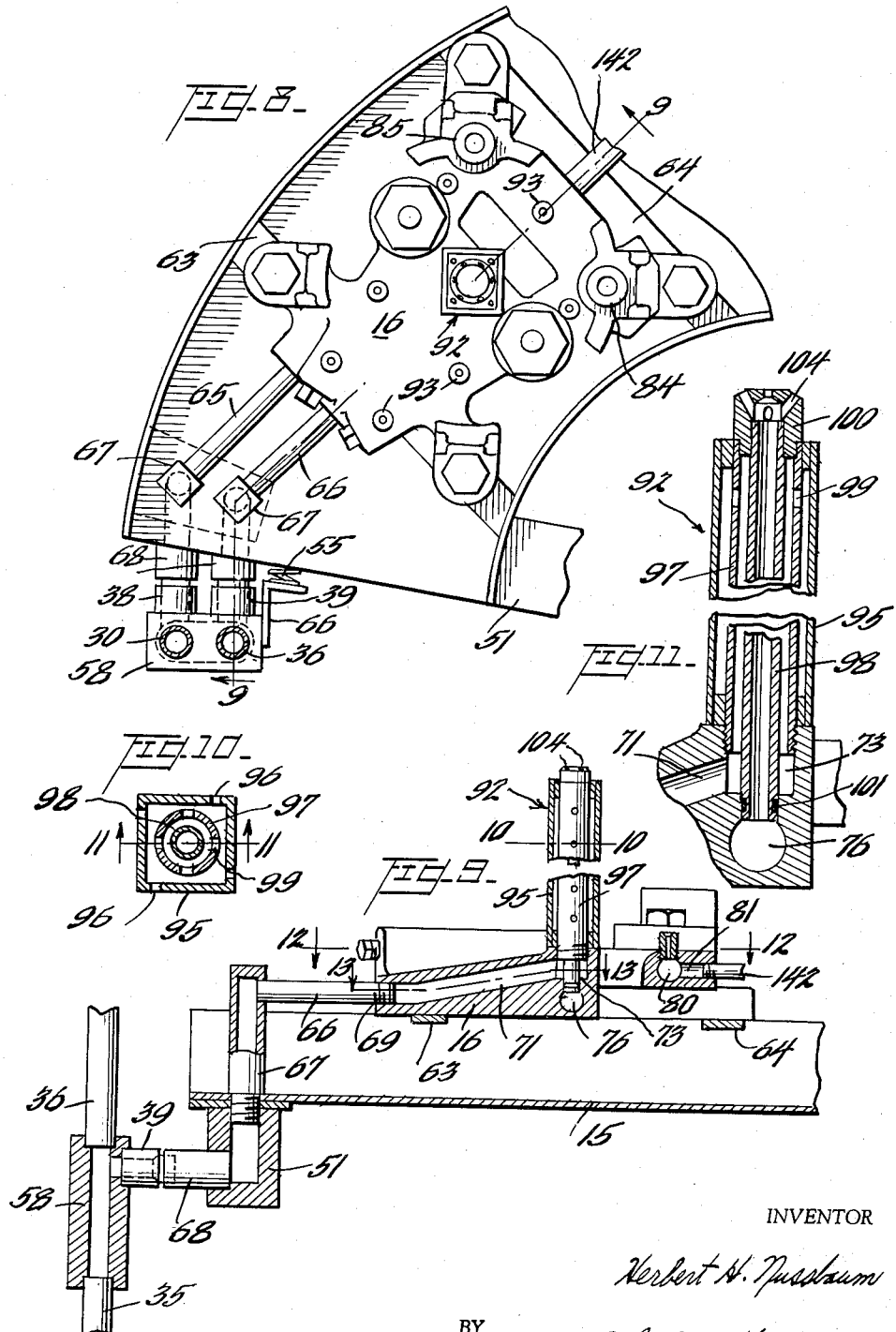

Jan. 10, 1961 H. H. NUSSBAUM 2,967,531
APPARATUS FOR WASHING RECEPTACLES
Filed Feb. 29, 1956 6 Sheets-Sheet 5
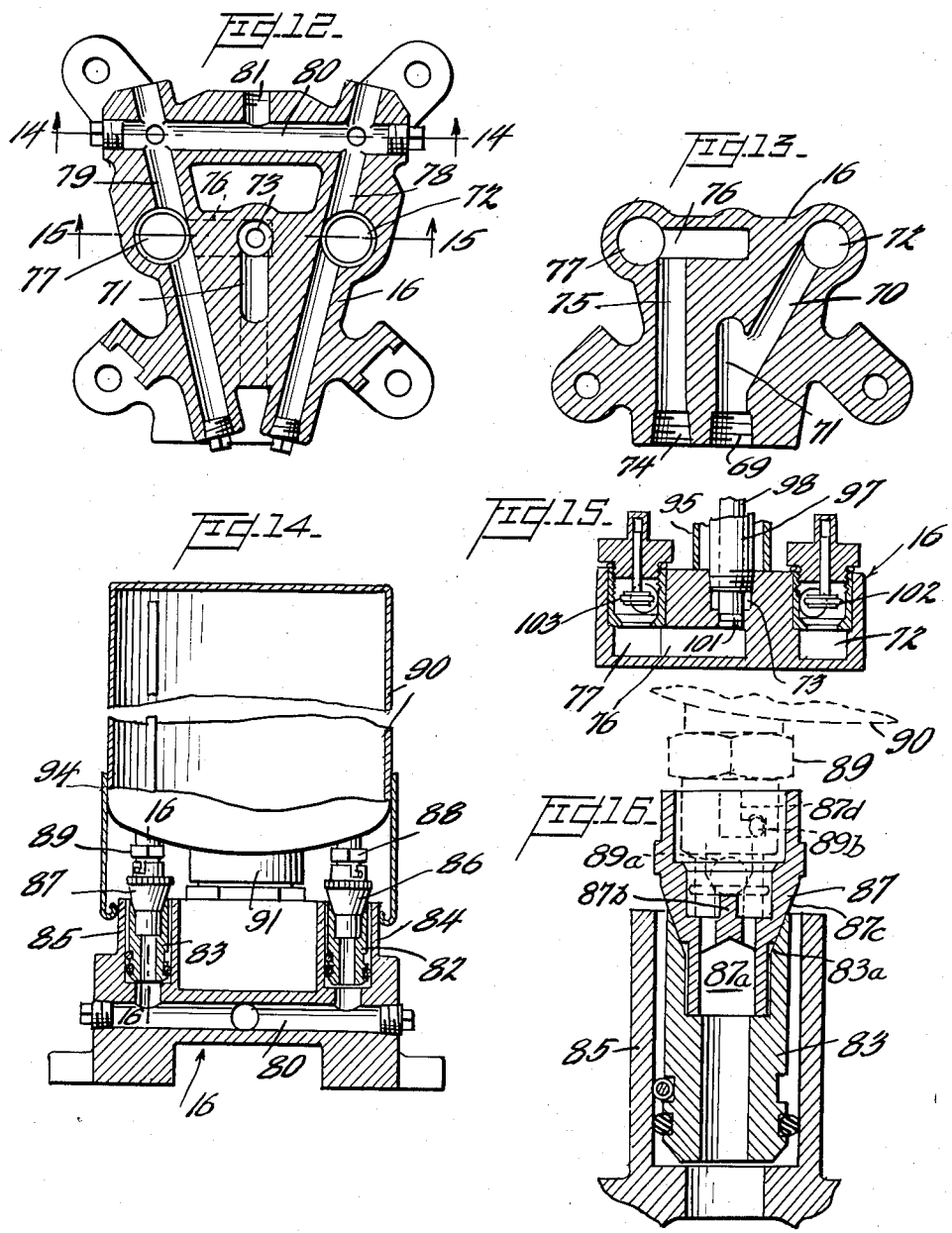
INVENTOR
Herbert H. Nussbaum
BY
Watson, Cole, Grindle & Watson
ATTORNEYS

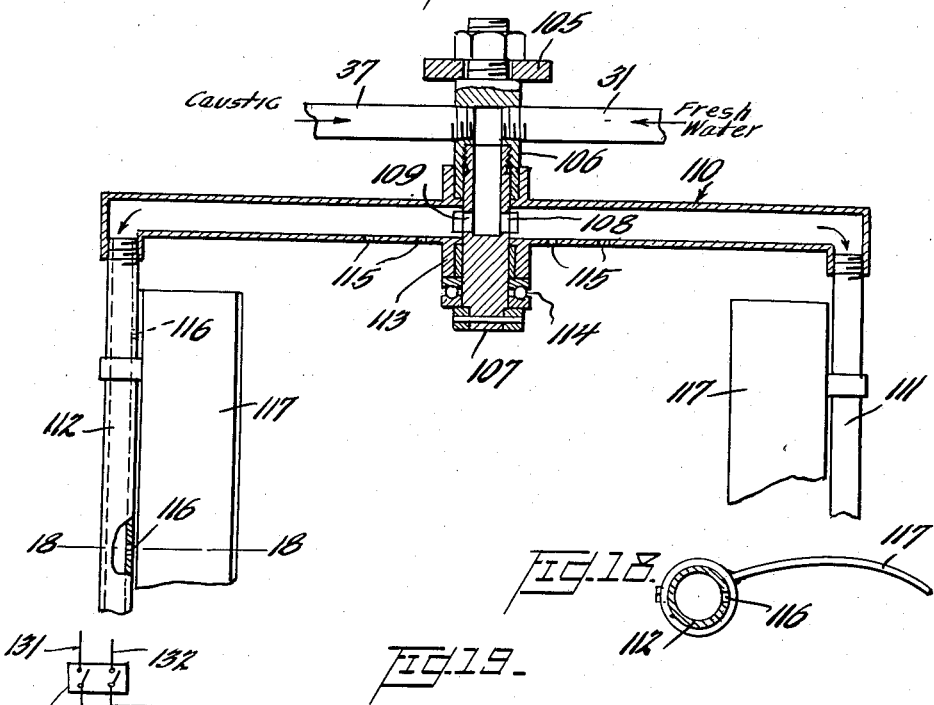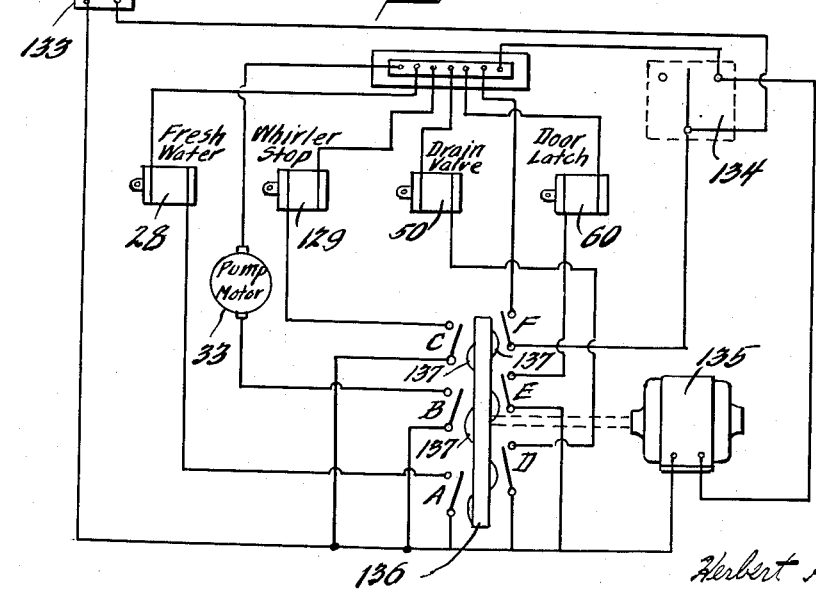

United States Patent Office 2,967,531
Patented Jan. 10, 1961

2,967,531

APPARATUS FOR WASHING RECEPTACLES

Herbert H. Nussbaum, Bainbridge, Ga., assignor to Miller Hydro Company, Bainbridge, Ga., a corporation of Georgia Filed Feb. 29, 1956, Ser. No. 568,644

6 Claims. (Cl. 134—95)

This invention relates to apparatus for washing receptacles, and more particularly to an automatic apparatus for rinsing and sterilizing steel containers such as used by the beverage industry for dispensing pre-mixed carbonated beverages. Such receptacles comprise generally cylindrical steel containers provided with a central opening in the top, used for filling the receptacle, and with two spring-pressed check valves, also located at the top of the receptacle, one for the admission of carbon dioxide under pressure, and the other for dispensing the carbonated beverage under the pressure of the gas admitted to the receptacle, from an outside pressure cylinder, through the first-mentioned valve. The beverage is dispensed, of course, with the aid of a fixture which includes means for holding open the dispensing valve for the required time. A dip tube, extending to the lower region of the receptacle, communicates with the dispensing valve.

The presence of the two aforesaid spring-pressed check valves necessitates, in apparatus for washing such receptacles, the provision of special means for maintaining such valves in open position during the washing process, and the provision of washing apparatus including such means is one of the objects of the present invention. It is also a general object of the invention to provide automatic apparatus for receiving and supporting receptacles of the character described and for automatically subjecting such receptacles to a pre-rinse, a sterilizing step, and a final rinse, after which the receptacle is delivered to a position outside the washing chamber. The clean receptacle is then removed from the apparatus and replaced by another receptacle to be cleansed.

More specifically, it is an object of the invention to provide apparatus for washing receptacles, comprising a source of sterilizing medium under pressure, a source of rinsing medium under pressure, interior and exterior spray devices, means for supporting a receptacle in position to be engaged by the spray from such devices, means for supplying, in succession, rinsing medium, sterilizing medium, and more rinsing medium to said spray devices, and timed sequential control means for the complete operation.

Another object is the provision of apparatus of the character described, including a return conduit connecting the washing chamber and the source of sterilizing medium, a disposal conduit connecting the washing chamber with a point of waste discharge, valves controlling said conduits, and means whereby one of said valves is opened and the other closed at appropriate points during the sequence of washing operations.

Another object is the provision, in an apparatus such as described, of an exterior spray device which rotates about the receptacle being washed, together with means for automatically arresting the rotation thereof, and latching the spray device in a fixed position, at the end of the washing cycle.

A further object is the provision, in apparatus of the character described, of a distributor head on which the receptacle to be washed is supported, such distributor head carrying an interior spray device for washing the interior of a receptacle, and also being provided with sockets by means of which the gas inlet and beverage dispensing valves of the receptacle, fitted with suitable adaptors, are received and supported, thus supporting the receptacle, the said sockets and adaptors constituting conduits by means of which the rinsing and sterilizing media are conducted from the distributor head through the said valves and dip tube. The distributor head is provided with valved passages such that rinsing medium is prevented from flowing back into the source of sterilizing medium, and vice versa.

Other and further objects, features and advantages will be apparent from the description which follows, read in connection with the accompanying drawings in which:

Figure 1 is a side elevational view of the entire apparatus with the near wall removed, certain of the parts being shown in section for better understanding;

Figure 2 is a plan view of the apparatus with the top of the washing chamber removed;

Figure 3 is a view similar to Figure 2 with the door of the washing chamber in open position;

Figure 4 is a front elevation of the control section with the near wall removed;

Figure 5 is a fragmentary sectional view on line 5—5 of Figure 3;

Figure 6 is a fragmentary sectional view on line 6—6 of Figure 5;

Figure 7 is a fragmentary sectional view on line 7—7 of Figure 6;

Figure 8 is a fragmentary plan view of the distributor head and associated parts;

Figure 9 is a sectional view on line 9—9 of Figure 8;

Figure 10 is a sectional view on line 10—10 of Figure 9;

Figure 11 is a sectional view on line 11—11 of Figure 10;

Figure 12 is a sectional view on line 12—12 of Figure 9;

Figure 13 is a sectional view on line 13—13 of Figure 9;

Figure 14 is a sectional view on line 14—14 of Figure 12, also showing the receptacle to be washed, fitted with adaptors, in place on the distributor head;

Figure 15 is a sectional view on line 15—15 of Figure 12;

Figure 16 is a sectional view on line 16—16 of Figure 14;

Figure 17 is a fragmentary sectional view on line 17—17 of Figure 3;

Figure 18 is a sectional view on line 18—18 of Figure 17, and

Figure 19 is a circuit diagram illustrating schematically the several control mechanisms and their electrical connections.

In order to facilitate an understanding of the invention, reference is made to the embodiments thereof shown in the accompanying drawings and detailed descriptive language is employed. It will nevertheless be understood that no limitation of the invention is thereby intended and that various changes and alterations are contemplated such as would ordinarily occur to one skilled in the art to which the invention relates.

The apparatus of the present invention may suitably be housed in an enclosure in the form of a washing chamber 10 and supported above a tank 11 for the sterilizing medium, and a control section 12 enclosing the various control mechanisms. The control section is provided with a removable door 13, while the washing chamber 10 is provided with a swinging door 14 carrying a pan 15 on which the distributor head 16 and certain other elements are secured and supported. A partition 17 forms the floor of the washing chamber 10 and the top of the tank 11. The bottom of the tank 11 is formed by a second partition 18, the side walls of the whole enclosure extending sufficiently below the partition 18 to provide space, above the floor on which the apparatus is supported, for the reception of water, steam and drain conduits. A fresh water supply conduit is indicated at 19, a disposal conduit at 20, a steam supply conduit at 21 and a condensate return conduit at 22. The steam supply conduit 21 extends to a thermostat valve 23 through which it is connected to the heating coil 24 within the tank 11, the other end of coil 24 being connected to the return conduit 22, thus providing means for heating a supply of sterilizing medium in the tank 11. A fresh water supply for use in mixing the sterilizing medium is provided through branch conduit 25 controlled by manual valve 26.

The fresh water conduit 19 extends to valve 27 controlled by a solenoid 28. Fresh water, under the usual pressure, is utilized as the rinsing medium in the present embodiment and is carried from the valve 27 through a horizontal conduit 29, riser 30 and upper horizontal conduit 31 to the exterior spray device later to be described. Caustic solution from the tank 11, utilized as the sterilizing medium in the present embodiment, is drawn from the tank through the suction port 32 of a motor-driven pump 33 and is supplied under pressure through the conduits 34, 35, riser 36 and conduit 37 to the aforesaid exterior spray device. The risers 30 and 36 are each in part constituted, within the washing chamber 10, by a coupler member 58 which provides through passages for the respective media and is formed with laterally directed coupling elements 38, 39, respectively, for supplying the respective media to the distributor head 16.

The partition 17 is provided with a drain port or passage 40 opening from the washing chamber 10 into the tank 11, and with a second drain passage 41 connecting with the disposal conduit 20. The drain passages 40 and 41 are provided with plug valves 42 and 43, respectively, carried on opposite ends of the horizontal arm of a bell crank lever 44, pivoted to upstanding bracket 45. The vertical arm 44' of the bell crank lever is connected to link 46 which extends outwardly of the washing chamber and is connected, through a spring 47, with a lever 48 pivoted at 49 and actuated by solenoid 50. Through the means just described, the valves 42 and 43 may be operated, alternatively and under the control of the timing mechanism to be described, to drain the washing chamber 10 into the tank 11 or into the disposal conduit 20, as the case may be.

The pan 15, secured to the door 14, is carried on a hinge comprising the arm 51 secured to hub 52 journaled on pivot 53, which latter is supported in a boss 54 of the partition 17. A spring 55 carried by the arm 51 engages and is compressed against a pad 56, secured on the coupler member 58, when the door 14 is closed (see Figure 2) for furnishing an opening impulse to the door 14 and its associated mechanism when the door latch 57 is disengaged. The door latch 57 is secured on a vertical pivot 58 (see Figure 4) journaled in a bracket 59, the pivot 58 being operatively connected to be rotated about its axis by the solenoid 60. A spring-pressed cushioning element 61 secured near the path of the swinging edge of the pan 15 is adapted to engage a stop element 62 on the latter as it approaches wide open position, to bring the door and pan to a cushioned stop in an open position and to yieldingly retain them in that position.

The distributor head 16, carried on braces 63 and 64 (Figure 3) extending across the sector-shaped pan 15, is provided with ports and passages to be described, the inlet ports thereof communicating with connector conduits 65, for water and 66, for caustic. Conduits 65 and 66 connect, by means of short risers 67 (Figure 9) carried by the arm 51, with coupling elements 68 which make mating engagement with the fixed coupling elements 38 and 39 when the door 14 is closed, thus providing communication between the risers 30 and 36, respectively, and the distributor head 16.

The details of distributor head 16 are illustrated in Figures 8 to 16, inclusive, from which it will be seen that the connector conduit 66, carrying caustic solution to the distributor head, connects with inlet port 69 of the distributor. Referring to Figures 12 and 13 it will be seen that two passages 70 and 71 connect with the inlet port 69. Passage 70 leads horizontally to a valve chamber 72 while passage 71 inclines upwardly (Figure 9) to a central bore 73. Inlet port 74 leads to horizontal passage 75 which in turn connects with a transverse passage 76, the latter connecting both with the central bore 73 and with a second valve chamber 77 similar to the valve chamber 72. The upper portion of valve chamber 72 connects with a horizontal passage 78 while valve chamber 77 connects, at its upper portion, with horizontal passage 79. The passages 78 and 79 are interconnected by transverse passage 80, with which an exit port 81 communicates.

Referring to Figure 14, it will be seen that the transverse passage 80 communicates, near its respective ends, with nozzle members 82 and 83, respectively, which are disposed in sealing engagement in bosses 84 and 85, respectively, of the distributor head. The nozzle members 82 and 83 receive and support adaptors 86 and 87, respectively, which are fitted, as by means of bayonet joints, onto the valves 88 and 89 of the receptacle 90 which is being washed. The latter, as previously described, is provided with a central opening or neck portion indicated at 91.

As will best be seen by reference to Figure 16, the adapter 87 has a passage 87a therethrough to establish communication between the valve 89 and the distributor head. A valve actuator pin 87b carried by a spider 87c in the adapter is disposed for projection into the casing of valve 89 to unseat the ball valve element 89a thereof when these parts are operatively coupled together. The aforesaid bayonet joint may be formed by the usual bayonet slots 87d in the adapter for cooperation with radial pins 89b on the casing of valve 89. For effecting a fluid-tight seal with the nozzle member 83, the lower end portion of the adapter may be formed with an external conical shoulder or portion 87e for sealing engagement with a conical surface 83a in the upper end of the nozzle member 83. It will be seen that the nozzle member 83 thus cooperates with the adapter to establish communication between it and the entrance passages of the distributor head.

An interior spray device 92 (Figure 11) is mounted in the central bore 73 and serves to spray the interior of the receptacle mounted thereover as seen in Figure 1. A plurality of small nozzles 93 are provided on the upper surface of the head 16 and are in communication with passages 78, 79 and 80, for spraying the neck portion 91 and surrounding area of the receptacle, lying inwardly of the protective collar 94 of the receptacle. The interior spray device 92 (Figure 11) comprises a rotatably mounted rectangular outer tube 95, provided with a plurality of spray apertures 96, an outer or caustic distributor pipe 97 and an inner water pipe 98 of smaller diameter. The pipe 97 is provided with lateral apertures 99 to permit caustic to enter the rectangular tube 95, while the smaller pipe 98 is provided at its outer end with a spray nozzle 100. Caustic solution is admitted to the central bore 73, and hence to the caustic distributor pipe 97 through the inclined passage 71, as hereinbefore described. Water is admitted to the pipe 98 through the transverse passage 76 and horizontal passage 75.

As will be understood, it is not desirable to introduce both water and caustic to the interior spray device at the same time, nor to permit either medium to enter, at any time, the passages intended for the other medium. To this end the pipe 98 is sealed at the bottom by an O-ring 101 to prevent caustic from the central bore 73 from entering the transverse passage 76, and likewise to prevent water from passage 76 from entering the bore 73. To the same end, the valve chambers 72 and 77, respectively, are provided with gravity-seated valves 102 and 103, respectively. When caustic solution enters the valve chamber 72 (and simultaneously the central bore 73 through passage 71), the valve 102 is raised by the pressure of the solution, permitting the solution to flow into passage 78, thence through passages 80 and 79 to the upper portion of the valve chamber 77. The pressure of such solution maintains valve 103 in tight engagement with its seat, thus preventing caustic solution from flowing past valve 103. Similarly, when water under pressure is admitted to valve chamber 77, it raises valve 103 and flows through passages 79, 80 and 78 to the upper portion of valve chamber 72, where its pressure maintains valve 102 in tight engagement with its seat, thus preventing the water from passing valve 102.

Referring back to the interior spray device 92, it is to be noted that the apertures 96 of the rectangular tube 95 are so disposed that upon the issuance of liquid from said apertures, a reaction force will cause the tube 95, which is revolubly mounted, to rotate, thus ensuring a thorough coverage of the walls of the interior of the receptacle. The nozzle 100, is likewise provided with a plurality of spray apertures 104 to ensure thorough spraying of rinse water over the interior of the receptacle. At the same time, sterilizing solution or rinse water, as the case may be, is passing into the receptacle through the valves 88 and 89, thus cleansing the respective valves and the aforementioned dip tube.

The exterior of the receptacle is cleansed by means of a rotary exterior spray device or "whirler" best seen in Figures 1, 17 and 18. As described earlier, water and caustic are supplied under pressure, alternatively, to the exterior spray device through conduits 31 and 37, respectively. The exterior spray device is supported on a member 105 extending across the chamber 10 and comprises a fixed hub 106 into which the conduits 31 and 37 extend, a hollow trunnion 107 threaded to the hub 106 and having lateral ports 108 and 109 and a rotary header 110 carrying oppositely disposed, downwardly extending apertured pipes 111 and 112. The hub 113 of the header 110 is mounted for rotation on a bearing 114 secured at the lower end of the trunnion 107. The respective arms of the header 110 are provided with spray apertures 115 for spraying the bottom of the inverted receptacle, while the downwardly extending pipes 111 and 112 are provided with apertures 116 for spraying the outer surface of the cylindrical receptacle wall. Curved vanes 117 are adjustably secured to each of the pipes 111 and 112, the base of the vanes being positioned near the apertures 116. By adjustment of the vanes 117 in relation to the apertures 116, a counterclockwise rotation (looking downwardly) is imparted to the exterior spray device or twirler when liquid under pressure issues from the apertures 116.

When the door 14 and pan 15 are swung inwardly or outwardly, at the beginning or end of a washing cycle, it is necessary that the twirler be stopped and held motionless. For this purpose the latching mechanism illustrated in Figures 5 to 7 is provided near the top of the wash chamber 10. A bracket 118 supported on the cross member 105 carries at one end a pivoted arm 119 and at the other end the pivoted lever 120. The former is forked as best seen in Figure 6, the branch 119a riding on the end of lever 120, by means of which the arm 119 is raised and lowered as will be described. It is biased to its lower position by means of a leaf spring 121 mounted on the underside of bracket 118.

The other branch 119b of arm 119 carries latch 122 which is pivoted at 126 and is adapted to be rocked upwardly through slot 123 in the branch 119b, the latch 122 being limited in its downward movement by means of a stop pin 124 which extends beyond the edges of the slot 123. The latch 122 is biased toward its lower position by a leaf spring 125 as seen in Figure 7.

The lever 120 extends outwardly through a slot 120' in the wall of the wash chamber and is articulated at 127 to a connector rod 128 (Figure 1) which is adapted to be moved downwardly by the energization of a solenoid 129 (Figure 4). When the connector rod 128 moves downwardly, the lever 120 is rocked accordingly, raising the arm 119 against the pressure of spring 121. When in this position the latch 122 and the depending lip 130 of the branch 119b are elevated out of the path of the header 110 of the twirler. This is the condition which obtains during the washing cycle. However, when the solenoid 129, is de-energized at the end of the washing cycle, the arm 119 is permitted to drop and the rotation of the twirler is arrested, the latch 122 being momentarily raised by engagement by the header 110, and dropping behind it as the latter is stopped by the depending lip 130.

The receptacles in question are, of course, provided with closures for the central opening 91, usually comprising a cap and a clamping ring, and the present invention includes provisions for washing these closure elements simultaneously with the washing of the receptacle. Thus, the pan 15 is provided with a basket 140 (Figure 2) for receiving the said closure elements, and a manifold 141 connected to the exit port 81 of the distributor 16 by means of a short conduit 142. A plurality of spray nozzles 143 are carried on the manifold 141, and direct a spray of water or caustic, as the case may be, upon the opposite sides of the closure elements resting in the basket 140.

The washing operation is sequentially controlled by the arrangement schematically illustrated in Figure 19 in which the main conductors of an electrical source are indicated at 131 and 132. When master switch 133 is closed a circuit is completed through door switch 134 (closed by the closing of door 14 as illustrated in Figure 2) and through timer motor 135. Operation of the timer motor rotates cam 136 which is adapted to actuate, in the timed sequence to be described, switches A, B, C, D, E and F. The circuit controlled by switch A includes the solenoid 28 controlling the fresh water. Switch B controls the circuit containing the motor of the pump 33, while switch C controls the circuit through the solenoid 129, actuating the whirler latch device. Switch D controls the circuit through solenoid 50 which operates drain valves 42, 43, switch E controls the circuit through the door latch solenoid 60 and switch F is adapted to close a circuit shunting the door switch 134, in order that the timer motor 135 may operate briefly after the door 14 opens, setting the cam 136 in correct position for the succeeding washing cycle. From the foregoing description, it will be apparent that the apparatus of the present invention functions as follows:

When the device is to be placed in operation, the master switch 133 is closed, steam having been admitted to the heating coil 24 previously in order to heat the sterilizing solution to the desired temperature. A receptacle is then placed, in inverted position, with adaptors affixed to its respective valves 88 and 89, over the interior spray device 92 and with the adaptors seated in the nozzles 82 and 83. The receptacle closure members are placed in the basket 140, and the door 14 is closed and automatically latched, compressing the spring 55. When the door closes the switch 134 is closed energizing the timer motor 135 and the cam 136 begins to rotate. The cam elevations 137, which are shown only schematically in Figure 19, are so arranged that the switches A and C are closed at the beginning of the washing cycle, thus admitting water to the conduit 29 and releasing the exterior spray device or twirler. The inside and the outside of the receptacle, and its closure elements reposing in basket 140, are thoroughly rinsed for a predetermined period. At the end of this period, the switch A breaks the circuit to solenoid 28, interrupting the admission of water, and the switch B closes the circuit to motor-driven pump 33, causing caustic solution to be introduced, under pressure, into the conduit 35. The receptacle and its closure elements are thus given a thorough sterilizing spray, after which the circuit to the pump 33 is interrupted and the solenoid 28 is again energized to admit rinsing water. The drain valves 42 and 43 are actuated at each change in the cycle, the solenoid 50 being energized at the conclusion of the rinsing cycle to close the disposal passage 41 and open the passage 40, so that during the sterilizing period the caustic solution may be returned from the chamber 10 to the tank 11. At the end of the sterilizing period, the position of the valves 42 and 43 is reversed.

At the conclusion of the second rinsing step the solenoid 60 is energized and solenoid 129 is de-energized, arresting the twirler spray and releasing the door latch and permitting the door 14 to open under the impulse imparted by spring 55. The receptacle is then removed and replaced by another.

Having thus described the invention, what is claimed as new and desired to be secured by Letters Patent is:

1. Apparatus for washing receptacles, comprising a source of sterilizing medium under pressure, a source of rinsing medium under pressure, an interior spray device, an exterior spray device, means for supporting a receptacle in inverted position and in surrounding and enclosing relation to said interior spray device and with the lateral wall of said receptacle disposed between said interior and exterior spray devices, means for supplying sterilizing medium and rinsing medium to said devices from said sources, and timed control means for said last-mentioned means, and adapter means secured to said receptacle in communication with interior of said receptacle, a distributor head, valve means in said distributor head for connectng one of said sources to said interior spray device and simultaneously interrupting the connection between said spray device and said other source, and sockets on said distributor head for receiving and supporting said adapters.

2. Apparatus for washing receptacles having spring-pressed valves and a central opening in the top thereof, comprising a source of sterilizing medium under pressure, a source of rinsing medium under pressure, an interior spray device, an exterior spray device, means for supporting a receptacle in inverted position and in surrounding and enclosing relation to said interior spray device and with the lateral wall of said receptacle disposed between said interior and exterior spray devices, means for supplying sterilizing medium and rinsing medium to said devices, timed control means for said last-mentioned means, adaptor means secured to said receptacle, a distributor head for alternatively connecting one of said sources to said interior spray device and interrupting the connection between said interior spray device and said other source, and sockets on said distributor head for receiving and supporting said adaptors.

3. Apparatus as defined in claim 2, said adaptors comprising valve depressors for maintaining open the valves of said receptacles, said adaptors and said sockets comprising conduit means connecting said distributor head and said receptacle valves.

4. Apparatus as defined in claim 1, wherein said distributor head includes inlet ports, means connecting one of said inlet ports to each said source, entrance passages in said distributor head connecting said inlet ports to said interior spray device, outlet ports in said distributor head, distributor passages in said distributor head connecting said entrance passages to said outlet ports, and separate valve means in said distributor respective passages for closing either distributor passage when medium under pressure is admitted to the other distributor passage.

5. Apparatus for washing receptacles, comprising a chamber having a movable door, a source of rinsing medium under pressure, a source of sterilizing medium under pressure, a distributor head carried on the inner side of said door, an exterior spray device rotatably mounted in said chamber and adapted to be rotated by the reaction force resulting from the issuance of medium therefrom, an interior spray device mounted on said distributor head, conduits connecting said exterior spray device to said respective sources and providing fixed coupling members for detachably connecting said distributor head with said sources, movable coupling members associated with said distributor head and adapted to mate with said first-mentioned coupling members when said door is closed, conduit means connecting said movable coupling members and said distributor head, and timed control means actuated by the closing of said door for latching said door in closed position, admitting rinsing medium to one of said first-mentioned conduits, interrupting said admission of rinsing medium and admitting sterilizing medium to said other first-mentioned conduit, interrupting said admission of sterilizing medium and reestablishing the said admission of rinsing medium, terminating the last-mentioned admission of rinsing medium, arresting the rotation of said exterior spray device, and unlatching said door.

6. Apparatus as defined in claim 5, including a return conduit connecting said chamber with said source of sterilizing medium, a disposal conduit extending from said chamber to a point of discharge, valve means for alternatively closing said return and disposal conduits, and means under the control of said timed control means for actuating said valve means.

References Cited in the file of this patent
UNITED STATES PATENTS

| Number | Name | Date |
|---|---|---|
| 103,371 | Reynolds | May 24, 1870 |
| 793,509 | Cooke | June 27, 1905 |
| 910,882 | Truesdell | Jan. 26, 1909 |
| 1,417,162 | Gagen | May 23, 1922 |
| 1,447,304 | Hauk | Mar. 6, 1923 |
| 1,504,578 | Rosenbaum | Aug. 12, 1924 |
| 1,670,611 | Couch | May 22, 1928 |
| 1,923,626 | Klein | Aug. 22, 1933 |
| 1,969,870 | Arbogast | Aug. 14, 1934 |
| 2,057,286 | Ash | Oct. 13, 1936 |
| 2,065,466 | Horn | Dec. 22, 1936 |
| 2,066,232 | Schmidt | Dec. 29, 1936 |
| 2,277,508 | Bingham | Mar. 24, 1942 |
| 2,558,628 | Redin | June 26, 1951 |
| 2,561,631 | Negri | July 24, 1951 |
| 2,594,222 | Sandora | Apr. 22, 1952 |
| 2,606,073 | Uhri | Aug. 5, 1952 |
| 2,669,240 | Thorson | Feb. 16, 1954 |
| 2,684,082 | Bletcher | July 20, 1954 |